(12) United States Patent
Masui et al.

(10) Patent No.: US 7,093,981 B2
(45) Date of Patent: Aug. 22, 2006

(54) SELF-ALIGNING BEARING (75) Inventors: Takashi Masui, Osaka (JP); Youichi Numada, Osaka (JP); Toshikazu Kawakami, Osaka (JP); Keiichi Miyoshi, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 79 days.

(21) Appl. No.: 10/487,307

(22) PCT Filed: May 22, 2003

(86) PCT No.: PCT/JP03/06385

§ 371 (c)(1),
(2), (4) Date: Feb. 19, 2004

(87) PCT Pub. No.: WO03/098062

PCT Pub. Date: Nov. 27, 2003

(65) Prior Publication Data

US 2004/0202393 A1    Oct. 14, 2004

(30) Foreign Application Priority Data

May 22, 2002    (JP)    ............................. 2002-147660

(51) Int. Cl.
*F16C 23/08*    (2006.01)

(52) U.S. Cl. ...................................... 384/558; 384/498
(58) Field of Classification Search ................ 384/558, 384/495, 498
See application file for complete search history.

(56) References Cited

U.S. PATENT DOCUMENTS

| 1,281,205 | A | * | 10/1918 | Pruyn | .......................... 384/498 |
| 4,037,892 | A | * | 7/1977 | Jahn et al. | ................... 384/558 |
| 4,595,302 | A | * | 6/1986 | Attinger et al. | ............. 384/558 |
| 4,673,302 | A | | 6/1987 | LaRou | |
| 5,823,687 | A | * | 10/1998 | Matsuda | ...................... 384/558 |

FOREIGN PATENT DOCUMENTS

| JP | 338613 | 1/1944 |
| JP | 47-31940 | 9/1972 |
| JP | 56-101418 | 8/1981 |
| JP | 9-257040 | 9/1997 |

* cited by examiner

Primary Examiner—Thomas R. Hannon
(74) Attorney, Agent, or Firm—Jordan and Hamburg LLP (57) ABSTRACT

In a self-aligning bearing positioning and supporting one end of a rotation shaft in an axial direction and allowing the rotation shaft to bend, the bearing is structured as a double row cylindrical roller bearing with aligning ring, a first row of cylindrical roller group is positioned by being held in an axial direction between a radially inward flange provided in an intermediate portion in an axial direction of an outer ring having an outer peripheral surface formed in a spherical surface shape, and a flange provided in one outer end of two inner rings, and a second row of cylindrical roller group is positioned by being held in the axial direction between the flange of the outer ring and a flange provided in another outer ends of the two inner rings.

10 Claims, 5 Drawing Sheets

SELF-ALIGNING BEARING

TECHNICAL FIELD

The present invention relates to a self-aligning bearing, for example, for supporting a fixed side of a roll shaft of a carrying system in a continuous casting equipment.

BACKGROUND ART

The roll shaft of the carrying system in the continuous casting equipment is bent, in accordance with passing of a work, such as a high temperature slab, or the like. Accordingly, both ends of the roll shaft are supported by a self-aligning bearing. As the self-aligning bearing for supporting the roll shaft mentioned above, there is employed a spherical roller bearing having a spherical roller, a cylindrical roller bearing with aligning ring having an outer ring, in which an outer peripheral surface is formed in a spherical shape, or the like. The cylindrical roller bearing with aligning ring can increase a load rating.

The roll shaft is structured such as to extend in an axial direction, in accordance with the passing of the high temperature work, and contract in the axial direction at the time of shutdown of an operation. Accordingly, it is necessary to position one end of the roll shaft in an axial direction and it is necessary to make another end of the roll shaft in a free state capable of expanding and contracting in the axial direction.

First, the structure is made such that the self-aligning bearing used in the one end side, that is the fixed side of the roll shaft is constituted by a single row cylindrical roller bearing with aligning ring, a flange is provided in both ends of inner and outer rings in the axial direction, and the cylindrical roller is positioned by each of the flanges in the axial direction.

The structure is made such that the self-aligning bearing used in another end side, that is, a free side of the roll shaft mentioned above is constituted by a single row cylindrical roller bearing with aligning ring, a flange is provided in both ends of any one of the inner and outer rings in the axial direction, another thereof is formed with no flange, and cylindrical roller is allowed to displace in the axial direction.

In the case that the self-aligning bearing in the fixed side mentioned above is constituted by the cylindrical roller bearing with aligning ring, the outer peripheral surface of the outer ring is formed in a spherical shape. Accordingly, a thickness of the outer ring in both ends in the axial direction is reduced, and a strength of the flange tends to be reduced. In order to secure a sufficient strength of the flange, it is necessary to increase a width of the flange in the axial direction and a thickness of both ends of the outer ring in the axial direction. However, in order to achieve the increase of width and thickness, it is necessary to increase an outer diameter of the outer ring as well as increasing an entire width of the outer ring in the axial direction. Accordingly, an outer shape of the self-aligning bearing is large-sized, and it is unavoidable to change design of an axle box.

However, in the case of restricting the entire width and the outer diameter of the outer ring in the axial direction so as not to change the design of the axle box, it is unavoidable to make an inner diameter of the outer ring small as well as to shorten a size of the cylindrical roller in the axial direction, resulting in lowering a load rating.

Taking the matters mentioned above into consideration, an object of the present invention is to improve a load rating and life of a self-aligning bearing, which positions one end of a rotation shaft axially expanded and contracted thermally, in an axial direction, without making an outer size larger.

DISCLOSURE OF THE INVENTION

In accordance with the present invention, there is provided a self-aligning bearing positioning and supporting one end of a rotation shaft in an axial direction and allowing the rotation shaft to bend, comprising:

a self-aligning ring having an inner peripheral surface formed in a spherical shape;

a single outer ring having an outer peripheral surface formed in a spherical shape and fitted to the inner peripheral surface of the self-aligning ring;

two inner rings inserted to the inner periphery of the outer ring via a predetermined interval; and a plurality of cylindrical rollers interposed in an annular space between the outer ring and the two inner rings in adjacent two rows in the axial direction, wherein a radially inward flange is provided between two rows of cylindrical rollers in the axial direction on the inner peripheral surface of the outer ring, and a radially outward flange is provided in an outer end in the axial direction of each of the two inner rings, respectively.

In summary, since the structure is made such that the cylindrical roller is arranged in double rows, the flange is provided in the intermediate portion of the outer ring in the axial direction, and also provided in the outer ends of the two inner rings, respectively, it is possible to set a total effective contact length of the double row cylindrical roller (obtained by adding an effective contact length of the double row cylindrical roller) and an inner diameter of the outer ring large step by step, without increasing the width and the outer diameter of the outer ring in the axial direction. Accordingly, even in the case that the outer size of the self-aligning bearing is restricted, a sufficiently large load rating can be secured in comparison to the conventional embodiment. Further, in comparison to the case that the cylindrical rollers are arranged in a single row, a load applied to each one of the cylindrical rollers is about one half on the assumption that a skew angle of the cylindrical roller is fixed. Accordingly, a force in an axial direction generated from the end surface of the cylindrical roller is about one half, so that the cylindrical roller advantageously tends to rotate smoothly.

In accordance with the present invention, there is provided a self-aligning bearing positioning and supporting one end of a rotation shaft in an axial direction and allowing the rotation shaft to bend, comprising:

a self-aligning ring having an inner peripheral surface formed in a spherical shape;

a single outer ring having an outer peripheral surface formed in a spherical shape and fitted to the inner peripheral surface of the self-aligning ring;

a single inner ring inserted to the inner periphery of the outer ring via a predetermined interval; and a plurality of cylindrical rollers interposed in an annular space between an inner peripheral surface of the outer ring and an outer peripheral surface of the inner ring in adjacent two rows in the axial direction, wherein a radially inward flange is provided between two rows of cylindrical rollers in the axial direction on the inner peripheral surface of the outer ring, and a radially outward flange is provided in an outer end in the axial direction of the two inner rings, respectively, and a flange ring is attached to an another outer end of the inner ring in the axial direction.

In this case, the structure is different from the structure of the invention described above in a point that the inner ring is set to the single, the flange is provided in one end in the axial direction, and the flange ring is attached to another end, however, the same advantages as those of the structure of the invention mentioned above can be basically obtained.

In this case, a full complement cylindrical roller type, in which the cylindrical rollers are arranged side by side in a circumferential direction without using the cage for holding the cylindrical rollers can be formed. Since the structure is made as the full complement roller type with no cage, it is possible to contribute to a further improvement of the load rating.

BEST MODE FOR CARRYING OUT THE INVENTION

Figure 1:
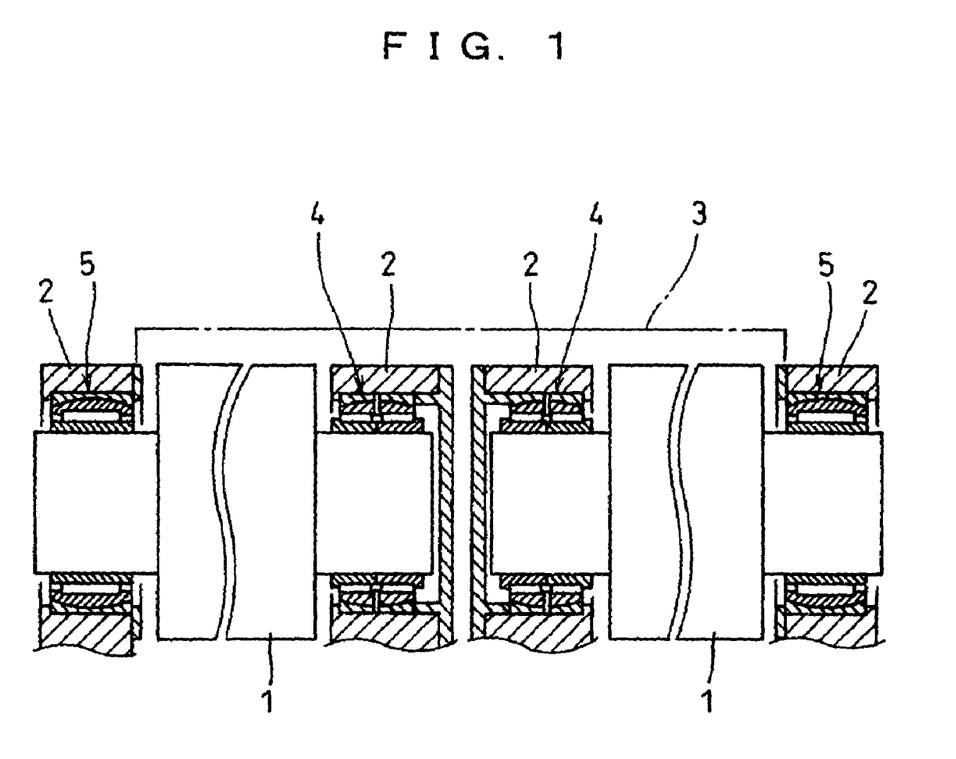
FIG. 1 is a cross sectional view showing a roll shaft supporting device, in accordance with a best embodiment of the present invention.
Figure 2:
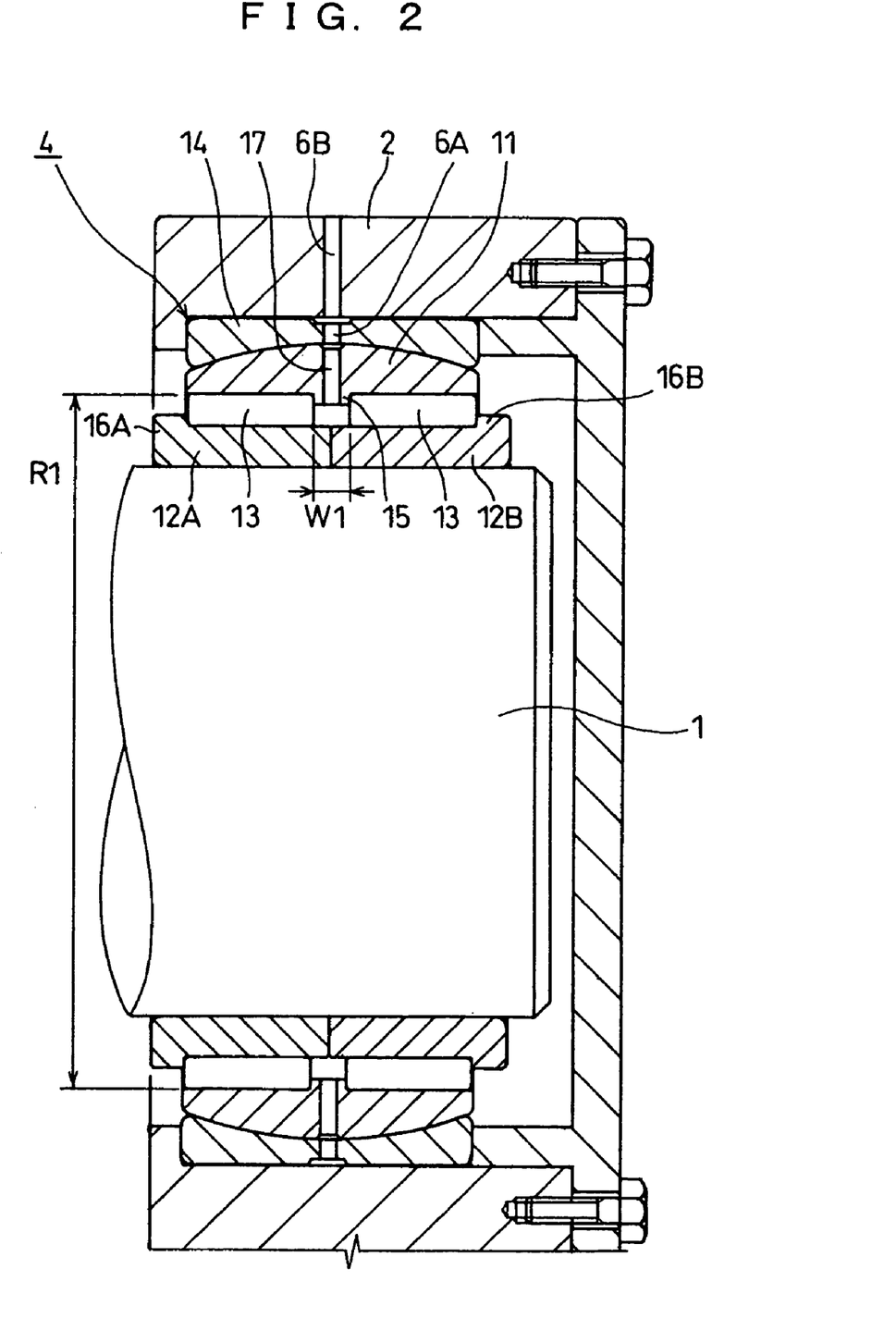
FIG. 2 is a cross sectional view showing a self-aligning bearing arranged in a fixed side of the roll shaft in FIG. 1.
Figure 3:
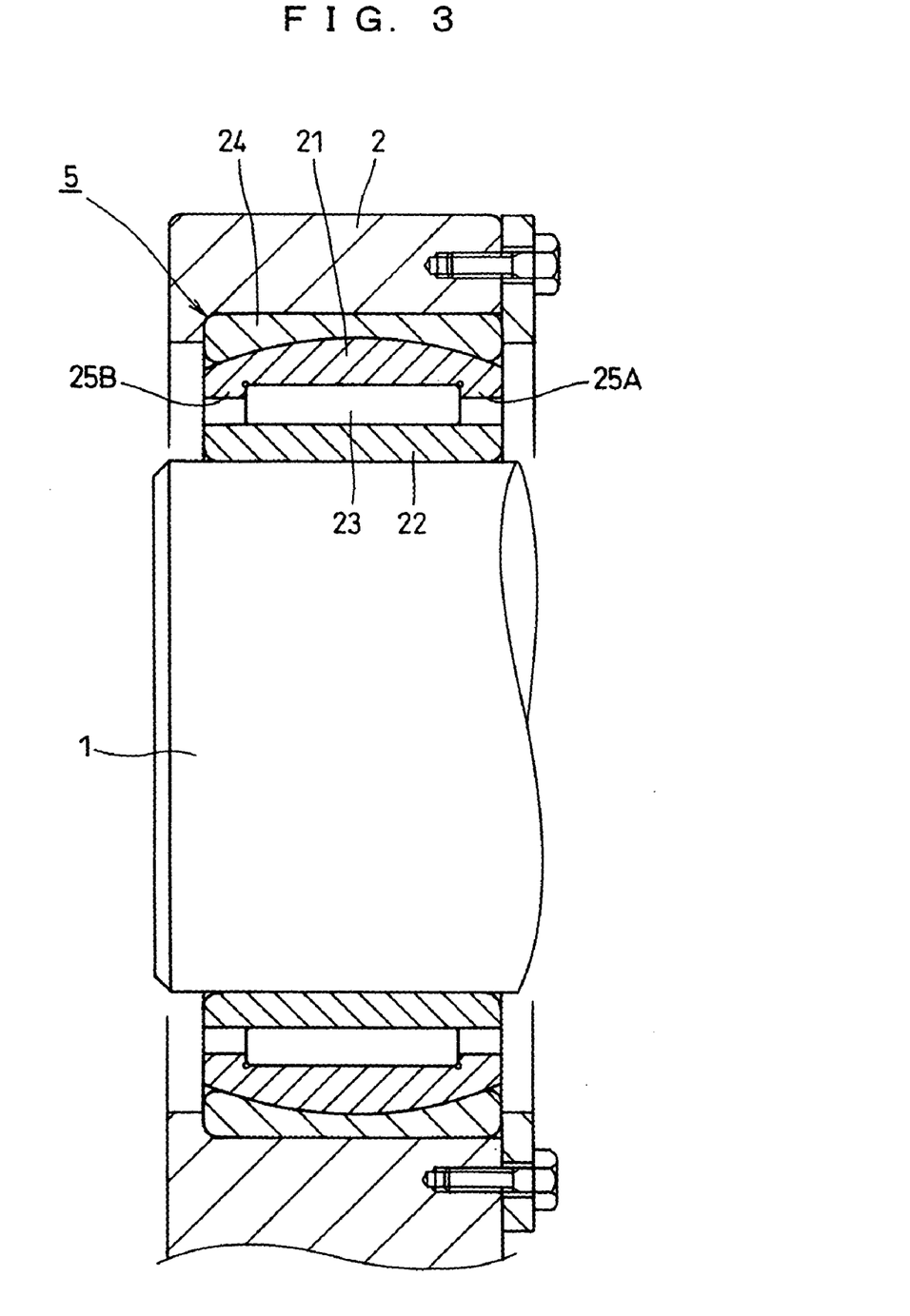
FIG. 3 is a cross sectional view showing a self-aligning bearing arranged in a free side of the roll shaft in FIG. 1.

A description is given of a roll shaft supporting device, in accordance with a best embodiment of the present invention with reference to FIGS. 1 to 3. In these views, reference numeral 1 denotes a roll shaft of a carrying system in a continuous casting equipment as one example of a rotational shaft. Reference numeral 2 denotes an axle box forming a supporting table supporting the roll shaft 1, and reference numeral 3 denotes a work, such as a slab. The roll shaft 1 is arranged in two positions adjacently in an axial direction, and both ends of both the roll shafts 1 and 1 are supported to the axle box 2 via self-aligning bearings 4 and 5.

As illustrated, the structure is made such that the high temperature work 3 passes through upper sides of a pair of roll shafts 1 and 1. When the high temperature work 3 passes over each of the roll shafts 1 and 1, each of the roll shafts 1 and 1 is thermally expanded and contracted under the influence of heat of the work 3. In this case, the roll shafts 1 and 1 are moved close to each other at a distance of a predetermined clearance in respective inner end sides, and are set in a state, in which the roll shafts 1 and 1 are positioned and fixed so as be immobile in an axial direction. Further, outer end sides of the roll shafts 1 and 1 can be displaced in the axial direction in response to the thermal expansion and contraction so as to allow the roll shafts 1 and 1 to thermally expand and contract.

On the basis of the condition mentioned above, the self-aligning bearings 4 and 4 constitute bearings supporting the inner ends of the roll shafts 1 and 1 and fixed side bearings positioned so as to be immobile in the axial direction. The self-aligning bearings 5 and 5 constitute bearings supporting the outer ends of the roll shafts 1 and 1 and free side bearings allowing the roll shafts 1 and 1 to thermally expand and contract in the axial direction.

A description is given of the fixed side self-aligning bearing 4 with reference to FIG. 2. The self-aligning bearing 4 is a so-called double row cylindrical roller bearing with aligning ring, and includes a single outer ring 11, two inner rings 12A and 12B, a plurality of cylindrical rollers 13 and an aligning ring 14. A radially inward flange 15 is provided in an intermediate portion of the outer ring 11 in the axial direction, and radially outward flanges 16A and 16B are integrally provided in respective outer ends of the first inner ring 12A and the second inner ring 12B, respectively.

A description is given of the free side self-aligning bearing 5 with reference to FIG. 3. The self-aligning bearing 5 is a so-called single row cylindrical roller bearing with aligning ring, and includes a single outer ring 21, a single inner ring 22, a plurality of cylindrical rollers 23 and an aligning ring 24. Radially inward flanges 25A and 25B are integrally provided in both ends of the outer ring 21 in the axial direction, and an outer peripheral surface of the inner ring 22 is formed in a cylindrical shape having a uniform outer diameter all around the periphery in the axial direction.

Each of the self-aligning bearings 4 and 5 is a full complement roller type bearing, which is used in a low speed rotation in the case of being applied to the roll shaft supporting device in the continuous casting equipment and does not employ any cage. However, the self-aligning bearing, in accordance with the present invention may be a bearing of a type using a cage in correspondence to a subject to be used.

The aligning rings 14 and 24 respectively provided in the self-aligning bearings 4 and 5 are structured such as to be cut on a circumference by one portion (not shown), however, may be structured as a two-pieces divided type separated in a center in the axial direction or a filling slot of the outer rings 11 and 21.

In the fixed side self-aligning bearing 4, the outer ring 11 is provided with a lubricating hole 17 extending along a radial direction in a center in the axial direction having a maximum outer diameter, and the self-aligning ring 14 and the axle box 2 are provided with oil feeding passages 6a and 6b communicated and connected with the lubricating hole 17. The self-aligning bearing 4 is lubricated, in accordance with a forced circulation of a lubricating oil via the lubricating hole 17 and the oil feeding passages 6a and 6b.

The fixed side self-aligning bearing 4 has double row cylindrical rollers 13 and 13, and has a structure, in which the radially inward flange 15 is provided in the intermediate portion of the inner peripheral surface of the outer ring 11 in the axial direction, and the radially outward flanges 16A and 16B are provided in the end portions of the outer peripheral surfaces of two inner rings 12A and 12B, respectively. In accordance with the structure of the self-aligning bearing 4, it is possible to set a total effective contact length of the cylindrical rollers 13 and 13 (a size obtained by summing up respective effective contact lengths of the cylindrical rollers 13) and an inner diameter of the outer ring 11 large, without increasing a width in the axial direction and an outer diameter of the outer ring 11. Further, in accordance with this embodiment, since the structure is made as the full complement roller type with no cage, it is possible to contribute to a further improvement of the load rating. Further, since the cylindrical rollers 13 and 13 are set to the double row type, a load applied to each of the cylindrical rollers becomes about one half on the assumption that a skew angle in each of the cylindrical rollers 13 and 13 is fixed, in comparison to the case of the single row type.

Accordingly, an axial load generated from each of the end surfaces of the cylindrical rollers 13 and 13 becomes about one half, and each of the cylindrical rollers 13 and 13 tends to smoothly rotate.

A description is given in detail of an advantage of the self-aligning bearing, in accordance with the present embodiment mentioned above with reference to FIGS. 5 and 6 showing self-aligning bearings, in accordance with a conventional embodiment.

Figure 5:
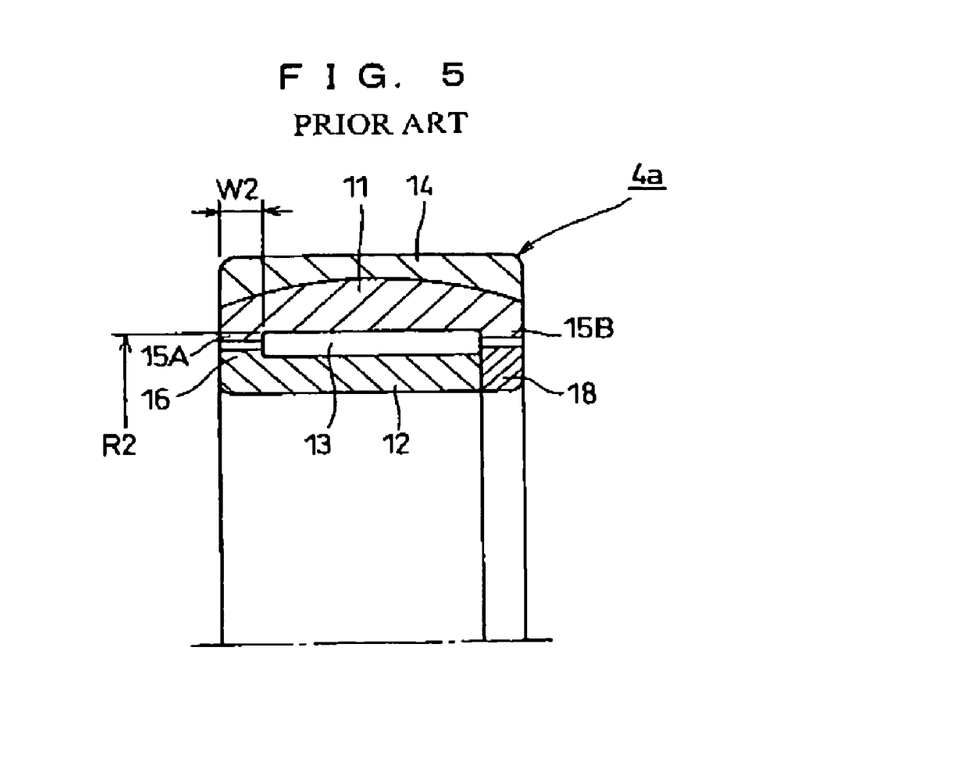
FIG. 5 is a cross sectional view showing a self-aligning bearing, in accordance with a conventional embodiment 1.

First, a self-aligning bearing 4a, in accordance with a conventional embodiment 1 shown in FIG. 5 is a so-called single row cylindrical roller bearing with aligning ring, and is structured such that radially inward flanges 15A and 15B are provided in both ends of a single outer ring 11 in an axial direction, a radially outward flange 16 is provided in one end of a single inner ring 12 in an axial direction, and a flange ring 18 is attached.

Figure 6:
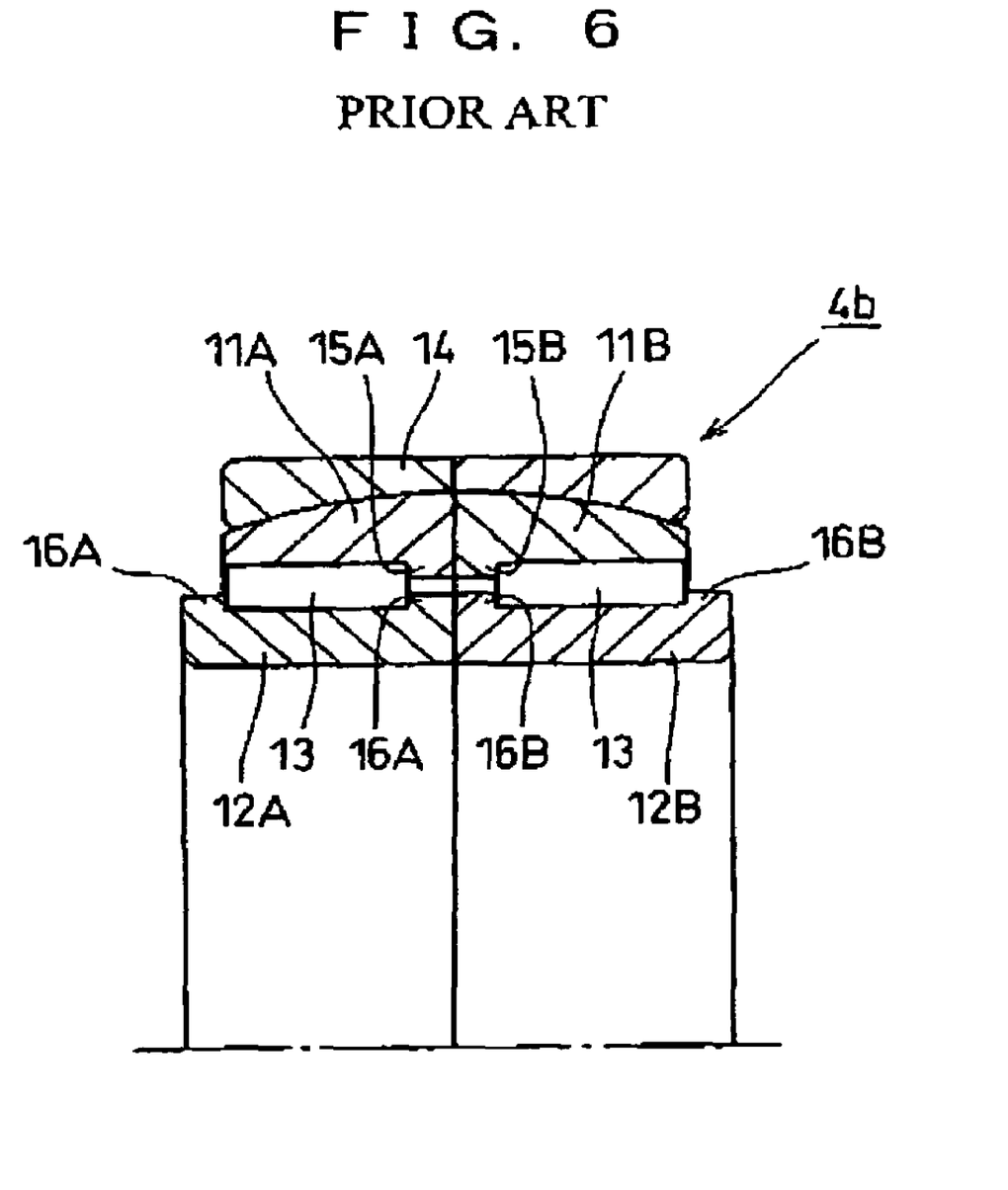
FIG. 6 is a cross sectional view showing a self-aligning bearing, in accordance with a conventional embodiment 2.

Further, a self-aligning bearing 4b, in accordance with a conventional embodiment 2 shown in FIG. 6 is a so-called double row combined cylindrical roller bearing with aligning ring, and is structured such that radially inward flanges 15A and 15B are provided in inner ends of two outer rings 11A and 11B in an axial direction, and radially outward flange 16A and 16B are provided in both ends of two inner rings 12A and 12B in an axial direction. Two outer rings 11A and 11B are connected by a pin, or the like (not shown).

In this case, in the case of the conventional embodiment 1 mentioned above, for the purpose of securing a strength of the flanges 15A and 15B of the outer ring 11, an outer size is increased.

In accordance with the present embodiment, since only one flange 15 of the outer ring 11 is provided in the thickest intermediate portion in the axial direction, the strength of the flange 15 can be strengthened without increasing the thickness of both ends of the outer ring 11 in the axial direction and the width of the flange 15 as in the conventional embodiment 1. Accordingly, a width W1 of the flange 15 in the present embodiment can be made smaller than a width W2 of the one flange 15A (15B) in the conventional embodiment 1, and the outer size of the outer ring 11 can be made smaller than that of the conventional embodiment 1. Therefore, in the case that the entire width of the outer ring 11 is fixed between the present embodiment and the conventional embodiment 1, it is possible to make the total effective contact length of the double row cylindrical rollers 13 (the size obtained by adding the respective effective contact lengths of the double row cylindrical rollers 13), in accordance with the present embodiment larger than the effective contact length of the single cylindrical roller 13, in accordance with the conventional embodiment 1. Further, in the case that the outer size of the outer ring 11 is fixed between the present embodiment and the conventional embodiment 1, the inner diameter R1 of the outer ring 11, in accordance with the present embodiment can be made larger than the inner diameter R2, in accordance with the conventional embodiment 1, whereby the number of the cylindrical rollers 13 to be used can be increased. On the basis of a synergistic effect thereof, the present embodiment can obtain a result that the load rating of the fixed side self-aligning bearing 4 can be improved.

In the case of the conventional embodiment 2, since two outer rings 11A and 11B are employed, each of two flanges 15A and 15B has a low strength even in the case in which the total width of each of the flanges 15A and 15B is set to be equal to the width of the flange 15, in accordance with the present embodiment. Accordingly, it is said that both the flanges 15A and 15B have a lower strength than the strength of the flange 15, in accordance with the present embodiment, so that in the case of the conventional embodiment 2, it is necessary to make the total width of the flanges 15A and 15B larger than the width of the flange 15, in accordance with the present embodiment, and the total effective contact length of the double row cylindrical rollers 13 in the conventional embodiment 2 becomes shorter than the present embodiment. Further, in the case of the conventional embodiment 2, since it is necessary to individually work the outer peripheral surfaces of two outer rings 11A and 11B in the spherical surface shape, there is a risk that the center of curvature of each of the outer rings 11A and 11B is deflected at the time of combining them, so that there is a risk that an aligning function is deteriorated. In comparison to the conventional embodiment 2 mentioned above, in accordance with the present embodiment, since it is sufficient to work the spherical surface on the basis of the single curvature with respect to the outer peripheral surface of the single outer ring 11, an accuracy of the shape is improved, and it is said that the aligning function becomes stable.

As mentioned above, with respect to the fixed side self-aligning bearing 4, since it is possible to improve the load rating and the life without changing the outer size, the design change of the supporting table, such as the axle box 2, is not required, thereby avoiding a wasteful increase of the equipment cost, and a stable carry of the work 4 can be achieved on the basis of an improvement of the supporting rigidity of the roll shaft 1.

Figure 4:
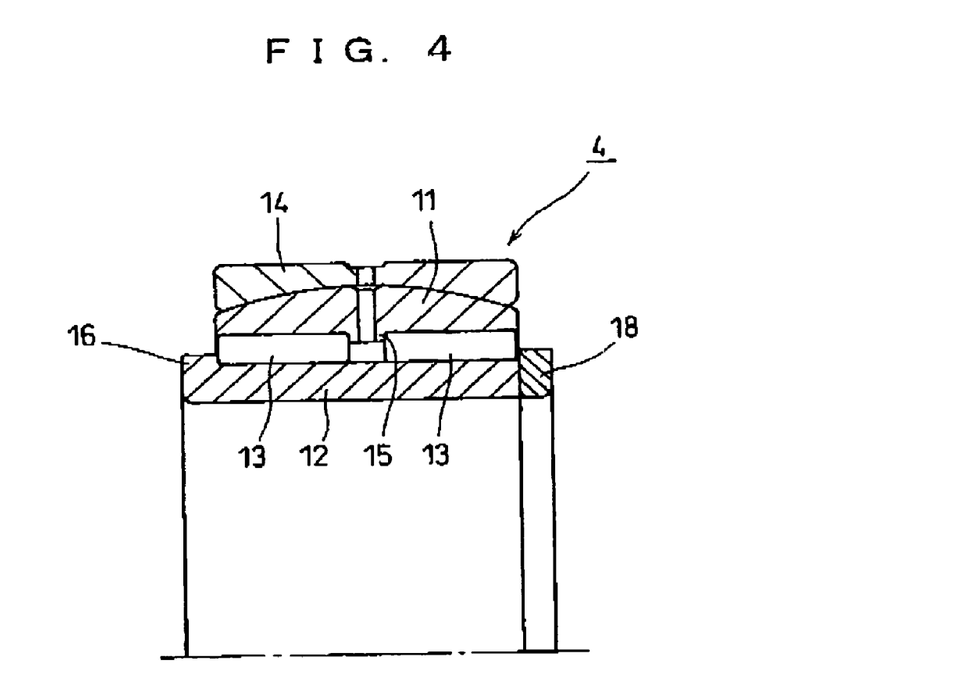
FIG. 4 is a view corresponding to FIG. 2 and shows another embodiment, in accordance with the present invention.

In the embodiment mentioned above, the fixed side self-aligning bearing 4 is structured such as to have two inner rings 12A and 12B, but can be structured such as to have one inner ring. In particular, as shown in FIG. 4, in the same manner as the inner ring 12 shown in FIG. 5, in accordance with the conventional embodiment 1, the structure may be made such that the radially outward flange 15 is provided in one end of the inner ring 12 in the axial direction, and the flange ring 18 is attached.

In the embodiment mentioned above, the fixed side self-aligning bearing 4 is not limited only to the case of being used in the fixed side of the roll shaft 1 of the carrying system in the continuous casting equipment, but can be used in various intended uses, for example, the case that a phase of the axial center in the fixed side is largely deflected with respect to the free side of the roll shaft 1.

INDUSTRIAL APPLICABILITY

The present invention can be applied to the self-aligning bearing for supporting the fixed side of the roll shaft of the carrying system in the continuous casting equipment.

The invention claimed is:

1. A self-aligning bearing positioning and supporting one end of an expanding/contracting rotation shaft in an axial direction and allowing the rotation shaft to bend, comprising:
    a self-aligning ring having an inner peripheral surface formed in a spherical shape;
    a single outer ring having an outer peripheral surface formed in a spherical shape and fitted to the inner peripheral surface of the self-aligning ring;
    two inner rings inserted to the inner periphery of the enter ring via a predetermined interval;
    a plurality of cylindrical rollers interposed in an annular space between the inner peripheral surface of the outer ring and the outer peripheral surfaces of the two inner rings in adjacent two rows in the axial direction, wherein a radially inward rib is provided between two rows of cylindrical rollers in the axial direction on the inner peripheral surface of the outer ring, and a radially outward rib is provided in an outer end in the axial direction of each of the two inner rings, respectively; and the radially inner periphery of each outer ring, at distal axially outer ends, having no radially inwardly projecting rib; and the radially outer periphery of the inner ring having no radially outwardly projecting rib disposed between the two rows of cylindrical rollers.

2. A self-aligning bearing as claimed in claim 1, wherein a lubrication hole extending along a radial direction is provided in a center of the outer ring in the axial direction, and an oil feeding passage communicated with the lubrication hole is provided in the aligning ring, respectively.

3. A self-aligning bearing as claimed in claim 1, wherein the bearing is formed as a frill complement cylindrical roller type, in which the respective cylindrical rollers are arranged side by side in a circumferential direction, without using a cage for holding the cylindrical rollers.

4. A self-aligning bearing positioning and supporting one end of an expanding/contracting rotation shaft in an axial direction and allowing the rotation shaft to bend, comprising:

a self-aligning ring having an inner peripheral surface formed in a spherical shape;

a single outer ring having an outer peripheral surface formed in a spherical shape and fitted to the inner peripheral surface of the self-aligning ring;

a single inner ring inserted to the inner periphery of the outer ring via a predetermined interval;

a plurality of cylindrical rollers interposed in an annular space between an inner peripheral surface of the outer ring and an outer peripheral surface of the inner ring in adjacent two rows in the axial direction, wherein a radially inward rib is provided between two rows of cylindrical rollers in the axial direction on the inner peripheral surface of the outer ring, and a radially outward rib is provided in an outer end in the axial direction of the single inner ring, respectively, and a loose rib is attached to an another outer end of the inner ring in the axial direction; and the radially inner periphery of each outer ring, at distal axially outer ends, having no radially inwardly projecting rib; and the radially outer periphery of the inner ring having no radially outwardly projecting rib disposed between the two rows of cylindrical rollers.

5. A self-aligning bearing as claimed in claim 4, wherein a lubrication bole extending along a radial direction is provided in a center of the outer ring in the axial direction, and an oil feeding passage communicated with the lubrication hole is provided in the aligning ring, respectively.

6. A self-aligning bearing as claimed in claim 4, wherein the bearing is formed as a full complement cylindrical roller type, in which tile respective cylindrical rollers are arranged side by side in a circumferential direction, without using a cage for holding the cylindrical rollers.

7. A roll shaft supporting device in a carrying system of a continuous casting equipment, in which two roll shafts are arranged side by side in an axial direction, both ends of each of the roll shafts being supported to an axle box corresponding to each of both the ends by using a self-aligning bearing, the self-aligning bearing comprising:

a fixed side self-aligning bearing supporting an inner end of each of the roll shafts so as to be immobile in an axial direction; and a free side self-aligning bearing supporting an outer end of each of the roll shafts in a free state in the axial direction, wherein the fixed side self-aligning bearing comprises:

a self-aligning ring having an inner peripheral surface formed in a spherical shape;

a single outer ring having an outer peripheral surface formed in a spherical shape and fitted to the inner peripheral surface of the self-aligning ring;

two inner rings inserted to the inner periphery of the outer ring via a predetermined interval; and a plurality of cylindrical rollers interposed in an annular space between the outer ring and the two inner rings in adjacent two rows in the axial direction, and wherein a radially inward rib is provided between two rows of cylindrical rollers in the axial direction on the inner peripheral surface of the outer ring, and a radially outward rib is provided an outer end in the axial direction of each of the two inner rings, respectively; and the radially inner periphery of each outer ring, at distal axial outer ends, having no radially inwardly projecting rib; and the radially outer periphery of the inner ring having no radially outwardly projecting rib disposed between the two rows of cylindrical rollers.

8. A roll shaft supporting device as claimed in claim 7 wherein a lubrication hole extending along a radial direction is provided in a center of the outer ring in the axial direction, and an oil feeding passage communicated with the lubrication hole is provided in each of he aligning ring and the axle box, respectively.

9. A roll shaft supporting device in a carrying system of a continuous casting equipment, in which two bending and expanding/contracting roll shafts are arranged side by side in an axial direction, both ends of each of the roll shafts being supported to an axle box corresponding to each of both the ends by using a self-aligning bearing, the self-aligning bearing comprising:

a fixed side self-aligning bearing supporting an inner end of each of the roll shafts so as to be immobile in an axial direction; and a free side self-aligning bearing supporting an outer end of each of the roll shafts in a free state in the axial direction, wherein the fixed side self-aligning bearing comprises:

a self-aligning ring having an inner peripheral surface formed in a spherical shape;

a single outer ring having an outer peripheral surface formed in a spherical shape and fined to the inner peripheral surface of the self-aligning ring;

a single inner ring inserted to the inner periphery of the outer ring via a predetermined interval;

a plurality of cylindrical rollers interposed in an annular space between an inner peripheral surface of the outer ring and an outer peripheral surface of the inner ring in adjacent two rows in the axial direction, wherein a radially inward rib is provided between two rows of cylindrical rollers in the axial direction on the inner peripheral surface of the outer ring, and a radially outward rib is provided in an outer end in the axial direction of the single inner ring, respectively, and a loose rib is attached to an another outer end of the inner ring in the axial direction; and the radially inner periphery of each outer ring, at distal axially outer ends, having no radially inwardly projecting rib; and the radially outer periphery of the inner ring having no radially outwardly projecting rib disposed between the two rows of cylindrical rollers.

10. A roll shaft supporting device as claimed in claim 9 wherein a lubrication hole extending along a radial direction is provided in a center of the outer ring in the axial direction, and an oil feeding passage communicated with the lubrication hole is provided in each of the aligning ring and the axle box, respectively.

* * * * *